(12) United States Patent
Chen et al.

(10) Patent No.: US 8,496,174 B2
(45) Date of Patent: Jul. 30, 2013

(54) SMART CARD OPERATING SYSTEM AND METHOD

(75) Inventors: Dacai Chen, Beijing (CN); Daxing Xu, Beijing (CN); Tongxin Qi, Beijing (CN)

(73) Assignee: Beijing Watchdata Systems Co., Ltd., Beijing (CN)

( * ) Notice: Subject to any disclaimer, the term of this patent is extended or adjusted under 35 U.S.C. 154(b) by 1500 days.

(21) Appl. No.: 11/890,553

(22) Filed: Aug. 7, 2007

(65) Prior Publication Data

US 2008/0051143 A1    Feb. 28, 2008

(30) Foreign Application Priority Data

Aug. 24, 2006  (CN) .......................... 2006 1 0112592

(51) Int. Cl.
*G06K 19/06* (2006.01)
(52) U.S. Cl.
USPC ........................................ 235/451; 235/492
(58) Field of Classification Search
USPC ................. 235/451, 375, 380, 382, 492, 493, 235/487, 486
See application file for complete search history.

(56) References Cited

U.S. PATENT DOCUMENTS

| | | | |
|---|---|---|---|
| 5,206,495 A | | 4/1993 | Kreft |
| 7,112,138 B2 * | | 9/2006 | Hedrick et al. ................. 463/29 |
| 7,413,124 B2 * | | 8/2008 | Frank et al. .................... 235/451 |
| 7,796,945 B2 * | | 9/2010 | Abbate et al. ................ 455/41.2 |
| 2003/0054881 A1 * | | 3/2003 | Hedrick et al. ................. 463/29 |
| 2004/0035930 A1 | | 2/2004 | Arisawa et al. |
| 2006/0252529 A1 * | | 11/2006 | Hedrick et al. ................. 463/29 |
| 2007/0124182 A1 * | | 5/2007 | Rai ..................................... 705/7 |
| 2008/0051195 A1 * | | 2/2008 | Hedrick et al. ................. 463/29 |
| 2009/0113513 A1 * | | 4/2009 | Dorney .......................... 725/135 |

FOREIGN PATENT DOCUMENTS

| | | |
|---|---|---|
| JP | 2005-085269 A | 3/2005 |
| JP | 2005-128746 A | 5/2005 |
| WO | WO 99/34326 A1 | 7/1999 |
| WO | WO 2005/069194 A1 | 7/2005 |

OTHER PUBLICATIONS

Mexican Office Action issued in Mexican Patent Application No. MX/a/2007/008874, dated Jun. 2, 2011.
Japanese Office Action issued in Japanese Patent Application No. 2007-192788, dated May 17, 2011.

(Continued)

*Primary Examiner* — Thien M Le
(74) *Attorney, Agent, or Firm* — McDermott Will & Emery LLP (57) ABSTRACT

The present invention relates to the smart card field, and more specifically to a smart card operating system and method, to avoid the failure of non-contact communication of the smart card operating system resulting from its inability to obtain the information of access to the non-contact field in the prior art. In the present invention, the communication state control module detects whether the smart card operating system enters and/or leaves the a non-contact field; and sets the communication state of the non-contact communication module of the smart card operating system based on the detection result. By applying the technical scheme of the present invention, we can avoid the communication failure which results from the non-contact communication module inability to respond properly to the inquiry from the non-contact terminal when the smart card operating system re-enters the non-contact field. Therefore, the non-contact communication can be maintained between the smart card operating system and the non-contact terminal equipment.

16 Claims, 3 Drawing Sheets

OTHER PUBLICATIONS

Extended European Search Report issued in European Patent Application No. 07252778.1, dated Dec. 23, 2010.

Indian Office Action issued in application No. 1038/KOL/2007 issued on Aug. 21, 2007.

* cited by examiner

SMART CARD OPERATING SYSTEM AND METHOD

CROSS REFERENCE TO RELATED APPLICATIONS

This application claims priority under 35 U.S.C. §119 from Chinese Patent Application No. 200610112592.1 filed on Aug. 24, 2006 in the State Intellectual Property Office of the People's Republic of China, the entire disclosure of which is incorporated herein by reference.

FIELD OF THE INVENTION

The present invention relates to the smart card field, and more specifically to a smart card operating system and method.

BACKGROUND OF THE INVENTION

With sustained development of the smart card technology, it is desirable that smart cards will have more flexible and richer functions. For instance, besides of the conventional SIM card functions, the SIM card can also work as payment card, access control card, clock card, and so on, which really achieves multi-application card. All these need the smart card operating system supports the contact and non-contact mixed working mode (referred to as mixed working mode).

An obvious difference between the mixed working mode and separated non-contact working mode is that: in the separated non-contact working mode, the system power is offered by the non-contact field, therefore, the system will reset since it is powered on again when the smart card leaves and re-enters the non-contact field; In the mixed working mode, the system power can be provided by the contact power supply, in this condition, the system will not reset when the smart card leaves and re-enters the non-contact field.

According to ISO14443 protocol, the non-contact communication can be divided into two stages identified by the non-contact communication state sign, wherein in the first stage (corresponding to Part 3 of ISO14443 protocol), the terminal equipment inquires the required information for the non-contact communication in the smart card operating system, and the smart card operating system responds to the terminal equipment; In the second stage (corresponding to Part 4 of ISO14443 protocol), the terminal equipment sends 14443-4 command to the smart card operating system, and the smart card operating system in the second stage will not respond to the inquiry from terminal equipment for information required for the non-contact communication. Thus it can be seen that a normal non-contact communication always begins at the first stage, and then enters the second stage.

As described above, in the mixed working mode, system power is supplied by means of contact method, namely, the system power is provided by the contact power supply, and non-contact communication always encounters such a problem.

After the non-contact communication enters the second stage, if the smart card operating system leaves and re-enters the non-contact field, the system will not reset since it is not powered on again, and the system can not find out it has ever left the non-contact field, therefore, the non-contact communication remains in the second stage and cannot start from the first stage, which leads to the failure of the non-contact communication between the system and the terminal equipment.

The above-mentioned problem also exists in smart card operating systems which are powered by fixed power source rather than the non-contact field to support the non-contact communication.

SUMMARY OF THE INVENTION

The present invention provides a smart card operating system and method to solve the problem in the prior art that the smart card operating system can not find out whether it passes in or out of the non-contact field, which will lead to the failure of non-contact communication.

In order to solve the foregoing technical problem, the present invention offers a smart card operating system including a non-contact communication module, and said smart card operating system also includes: a communication state control module, which connects with said non-contact communication module to detect whether said smart card operating system enters and/or leaves the non-contact field and set the communication state of said non-contact communication module based on the detection result.

Furthermore, the foregoing system also has the following feature: said communication state control module includes: the first detecting sub-module, which detects whether said smart card operating system enters and/or leaves the non-contact field or not and creates interrupt when said smart card operating system enters and/or leaves the non-contact field.

The first setting sub-module, which sets communication state of said non-contact communication module as IDLE based on said interrupt.

Furthermore, the foregoing system may also have the following feature: said first detecting sub-module includes: the first storage unit and the first detecting unit, and said first detecting unit detects the non-contact power and/or clock, determines, according to the non-contact power and/or clock sign stored in said first storage unit, whether the non-contact power and/or clock is switching from inexistence to existence or from existence to inexistence, to find out whether the smart card operating system is passing in or out of the non-contact field, and sets respectively said non-contact power and/or clock sign when said smart card operating system enters and leaves the non-contact field, and creates interrupt when said smart card operating system enters and/or leaves the non-contact field.

Furthermore, the foregoing system may also have the following feature: said communication state control module includes: the second detecting sub-module to periodically detect whether said smart card operating system leaves the non-contact field or not, and to output the detection result.

The second setting sub-module to set the communication state of said non-contact communication module as IDLE based on said detection result.

Furthermore, the foregoing system may also have the following feature: said second detecting sub-module includes: period control unit to output the triggering signal according to the set cycle; the second detecting unit to periodically detect the non-contact power and/or clock according to said triggering signal, and output the detection result when said smart card operating system leaves the non-contact field.

Furthermore, the foregoing system may also have the following feature: said system also includes a dormancy control module which connects with said communication state control module; said non-contact communication module also includes an awaking sub-module which connects with said dormancy control module.

After said communication state control module sets the communication state of said non-contact communication module, said dormancy control module controls said communication state control module into dormancy state; said awaking sub-module finds out that said system enters the non-contact field based on the inquiry result from the non-contact terminal equipment, and informs said dormancy control module to awake said communication state control module.

Furthermore, the foregoing system may also have the following feature: said system also includes the second initial module to initialize said communication state control module and set the state of said communication state control module as dormancy when the system is powered on.

Furthermore, the foregoing system may also have the following feature: said system also includes the first initial module which connects respectively with said non-contact communication module and said communication state control module, when setting the communication state of said non-contact communication module, in the meantime, said communication state control module also informs said first initial module to initialize said non-contact communication module.

Furthermore, the foregoing system may also have the following feature: said non-contact communication module includes the second storage unit which stores the state sign for the non-contact communication state to identify the communication state of said non-contact communication module.

The present invention also provides a smart card operating method, which includes the following steps: detecting whether said smart card operating system enters and/or leaves the non-contact field or not; setting the non-contact communication state of said smart card operating system based on the detection result.

Furthermore, the foregoing method may also include the following feature: Said setting the non-contact communication state of said smart card operating system based on the detection result includes: setting the non-contact communication state of said smart card operating system as IDLE based on the detection result that said smart card operating system enters the non-contact field; and/or setting the non-contact communication state of said smart card operating system as IDLE based on the detection result that said smart card operating system leaves the non-contact field.

Furthermore, the foregoing method may also include the following feature: determining whether said system enters the non-contact field or not according to whether the non-contact power and/or clock switches from inexistence to existence or not; and/or determining whether said system leaves the non-contact field or not according to whether the non-contact power and/or clock change from existence to inexistence.

Furthermore, the foregoing method may also include the following feature: detecting the non-contact power and/or clock according to a predetermined cycle, and determining whether said system left the non-contact field or not based on whether there exists the non-contact power and/or clock.

Furthermore, the foregoing method may also include the following feature: the smart card operating system stops detecting the non-contact power and/or clock after its communication state is set, and restarts periodically detect the non-contact power or clock after it finds out that said system enters in the non-contact field based on the inquiry from the non-contact terminal equipment to said system.

The benefit of the present invention is as follows:

The present invention detects whether the smart card operating system enters and/or leaves the non-contact field or not, and sets the communication state of said smart card operating system based on the detection result, therefore, when the smart card operating system re-enters the non-contact field, the communication failure, which is because that the non-contact communication module cannot response properly to the inquiry of the non-contact terminal, can be avoided, and normal non-contact communication can be maintained between the smart card operating system and the non-contact terminal equipment.

It is obvious that the present invention is especially suit for the smart card operating system which uses the non-contact power supply, and in this case, the system will not reset when the smart card operating system leaves and re-enters the non-contact field because the system will not be powered on again. Therefore, the system needs to apply the technical scheme of the present invention to find out whether it enters and/or leaves the non-contact field or not, and set the communication state of said smart card operating system based on the detection result, which ensures the normal non-contact communication between the smart card operating system and the non-contact terminal equipment.

DETAILED DESCRIPTION OF THE INVENTION

The kernel idea of the present invention is to detect whether the smart card operating system enters and/or leaves the non-contact field or not, and set the non-contact communication state of said smart card operating system based on the detection result.

The present invention will be further described with reference to the accompanying drawings and the embodiments.

The First Embodiment

In this embodiment, the smart card operating system realtimely detects whether the smart card operating system enters and/or leaves the non-contact field or not and sets the non-contact communication state as IDLE of the first stage.

Figure 1:
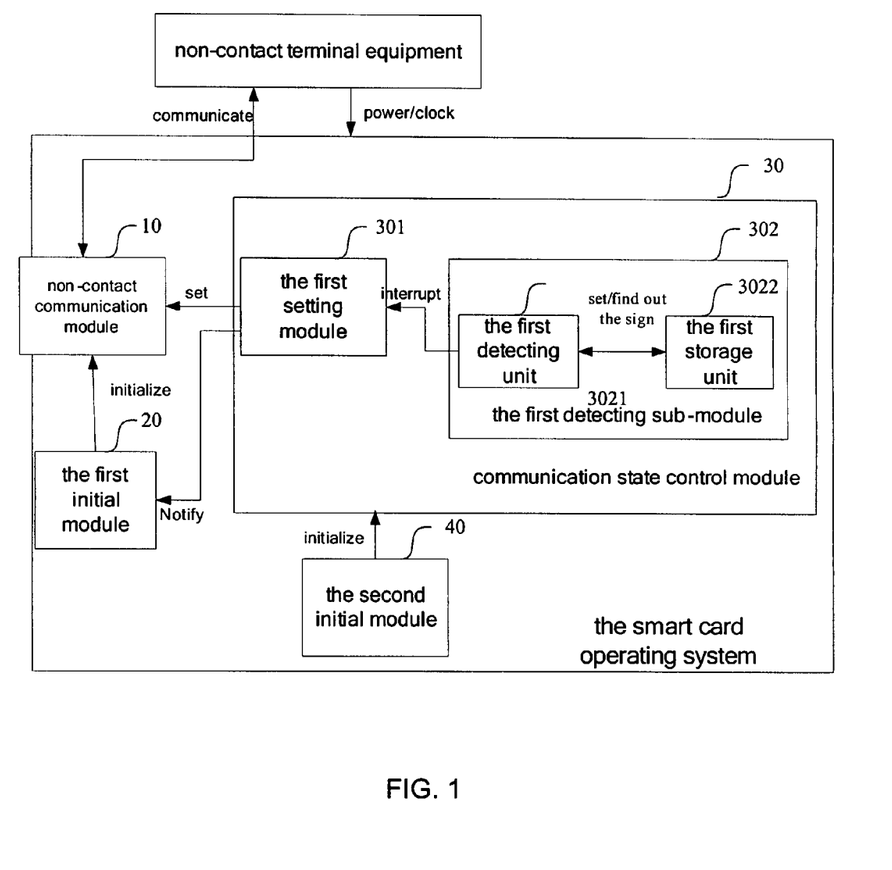
FIG. 1 is a block diagram of a smart card operating system in accordance with the first embodiment of the present invention.

As shown in FIG. 1, the smart card operating system in this embodiment includes the non-contact communication module 10, the first initial module 20, the communication state control module 30, and the second initial module 40, wherein, the communication state control module 30 includes the first setting sub-module 301 and the first detecting sub-module 302, and the first detecting sub-module 302 includes the first detecting unit 3021 and the first storage unit 3022.

Figure 2:
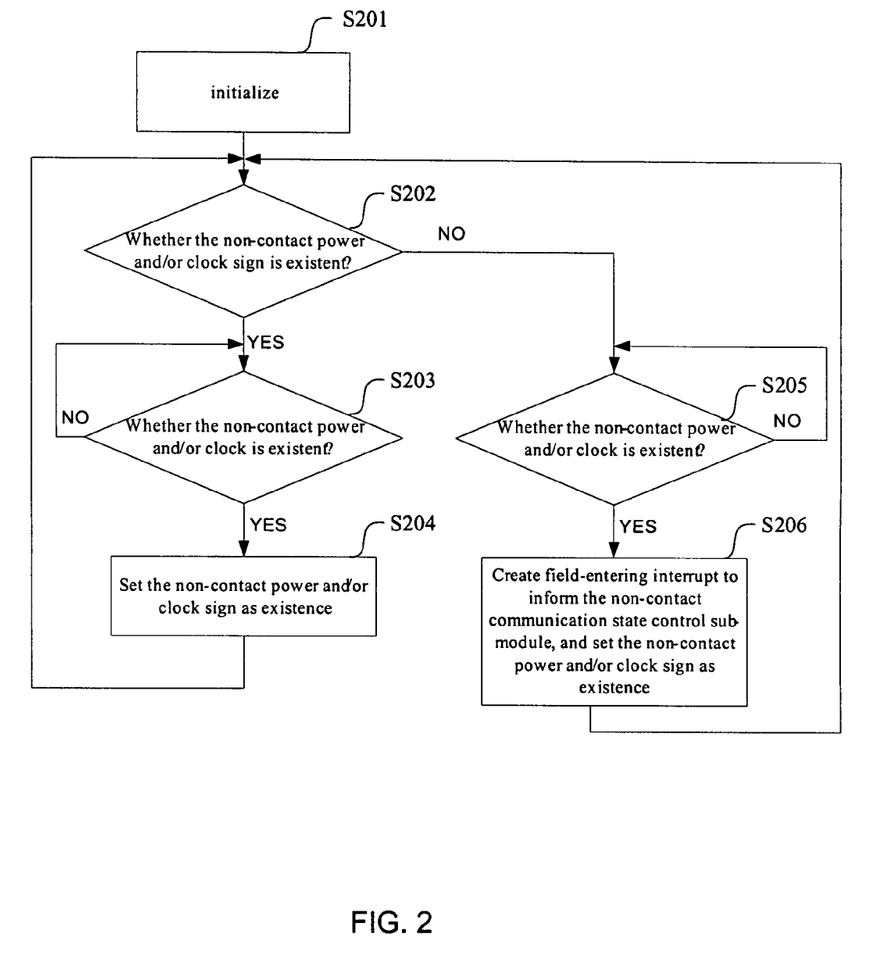
FIG. 2 is a flow chart of creating interrupt of entering the field in accordance with the first embodiment of the present invention.

The flow of creating field-entering interrupt in this embodiment is shown as FIG. 2, which includes the following steps: step S201, when the system is powered on, the first initial module 20 and the second initial module 40 initialize the non-contact communication module 10 and the communication state control module 30, respectively. Especially in this embodiment the second initial module 40 initializes the non-contact power and/or clock sign in the first storage unit 3022 as inexistence of non-contact power and/or clock (where the sign can also be initialized as existence of non-contact power and/or clock, but this embodiment will be described based on inexistence as the sign of the non-contact power and/or clock in the initial setting).

Step S202, the first detecting unit 3021 reads the sign of non-contact power and/or clock in the first storage unit 3022, if the sign is existence of the non-contact power and/or clock, step S203 is processed; otherwise, step S205 is processed.

Step S203, the first detecting unit 3021 detects the non-contact power and/or clock, and if the non-contact power and/or clock is detected to be inexistent, step S204 is processed, otherwise return to step S203 to detect.

Step S204, the first detecting unit 3021 sets the sign of the non-contact power and/or clock in the first storage unit 3022 as inexistence of the non-contact power and/or clock, and return to step S202.

Step S205, the first detecting unit 3021 detects the non-contact power and/or clock, and if the non-contact power and/or clock is detected to be existent, step S206 is processed, otherwise return to step S205 to detect.

Step S206, the first detecting unit 3021 considers that the smart card operating system enters the non-contact field, creates field-entering interrupt and informs the first setting sub-module 301, and sets sign of the non-contact power and/or clock in the first storage unit 3022 as inexistence of the non-contact power and/or clock, then return to step S202.

The first setting sub-module 301 sets the non-contact communication state of the non-contact communication module 10 as IDLE of the first stage, and the sign of the non-contact communication state is stored in the second storage unit in the non-contact communication module 10.

It can be seen that in this embodiment, when the non-contact power and/or clock change form inexistence to existence, the smart card operating system is thought to be entering the non-contact field, which means the smart card operating system was not in the non-contact field in a former time period when the sign of the non-contact communication state of the non-contact communication module 10 is set as IDLE of the first stage to ensure that the sign of non-contact communication state of the non-contact communication module 10 is set as IDLE of the first stage when the smart card operating system enters the non-contact field every time. Therefore, the communication failure caused by identifying the non-contact communication state of the non-contact communication module 10 as the second stage can be avoided. In this embodiment, the non-contact communication state sign of the non-contact communication module 10 is set as IDLE of the first stage, because that IDLE is the initial state of the non-contact communication module 10, and that the non-contact communication of the smart card operating system begins from IDLE, which can make sure that the non-contact communication module 10 can properly respond to all the inquiry from the non-contact terminal equipment, and if the non-contact communication state sign is set as other state of the first stage, the communication may fail since system may not respond properly to these inquiries which can only be responded to at IDLE state.

In concrete implementation of the smart card operating system, the value of some registers is changed (compared with that when the non-contact communication state is IDLE of the first stage) after part of the non-contact communication module of the smart card operating system begins the non-contact communication, which may affect the communication between the smart card operating system and the non-contact terminal equipment, and even result in the failure of the communication. Therefore, in order to ensure the normal communication between the smart card operating system and the non-contact terminal equipment, the first setting sub-module 301 also informs the first initial module 20 based on the field-entering interrupt, and the first initial module 20 initializes the non-contact communication module 10 to recover the initial value of each register.

Obviously, the step of setting the non-contact communication state as IDLE of the first stage can also be processed when the smart card operating system leaves the non-contact field. Therefore, in one variation of the present embodiment, the first detecting unit 3021 detects the non-contact power and/or clock according to the sign of non-contact power and/or clock in the first storage unit 3022, if the sign of non-contact power and/or clock in the first storage unit 3022 is inexistence of the non-contact power and/or clock, the sign of the non-contact power and/or clock sign is set as existence once existent non-contact power and/or clock are detected. If the sign of non-contact power and/or clock in the first storage unit 3022 is set as existence of non-contact power and/or clock, then once the non-contact power and/or clock is detected to be inexistent, the smart card operating system is thought to be leaving the non-contact field, a field-leaving interrupt is created to inform the first setting sub-module 301, and the sign of non-contact power and/or clock is reset as inexistence of the non-contact power and/or clock.

Obviously, in the above variation of said embodiment, when the non-contact power and/or clock switches from inexistence to existence, the smart card operating system is thought to be leaving the non-contact field, at this moment, the non-contact communication state of the non-contact communication module 10 is set as IDLE at the first stage, which can guarantee the IDLE state at the first stage for the communication state of the non-contact communication module 10 when the smart card operating system reenters the non-contact field next time, and thus avoid the communication failure resulting from the non-contact communication state of the non-contact communication module 10 being the second stage.

Of course, in concrete implementation, the first detecting unit 3021 can not only create a field-entering interrupt and inform the first setting sub-module 301 when the smart card operating system enters the field, but also create a field-leaving interrupt and inform the first setting sub-module 301 when the smart card operating system leaves the field.

In concrete implementation, the smart card operating system can directly obtains the change of the non-contact power state in real time based on the voltage change without applying the sign of non-contact power and/or clock, wherein, the smart card operating system is thought to be entering the non-contact field and a field-entering interrupt is created when it is detected that the non-contact power switches from inexistence to existence; and the smart card operating system is thought to be leaving the non-contact field and a field-leaving interrupt is created when it is detected that the non-contact power switches from existence to inexistence; or both field-entering interrupt and field-leaving interrupt are created.

Considering the available smart card operating systems are capable of providing field-entering and/or field-leaving interrupts, it can be easily implemented and be able to find out the status of entering and/or leaving the field for the smart card operating system by applying field-entering and/or field-leaving interrupts to set the sign of the non-contact communication state as IDLE of the first stage in this embodiment, therefore the proper communication between the non-contact communication module 10 and the non-contact terminal equipment can be guaranteed.

The Second Embodiment

In this embodiment, the smart card operating system detects whether the smart card operating system leaves the non-contact field or not in predetermined cycle, and sets the non-contact communication state as IDLE of the first stage when the smart card is detected to be leaving the non-contact field.

Figure 3:
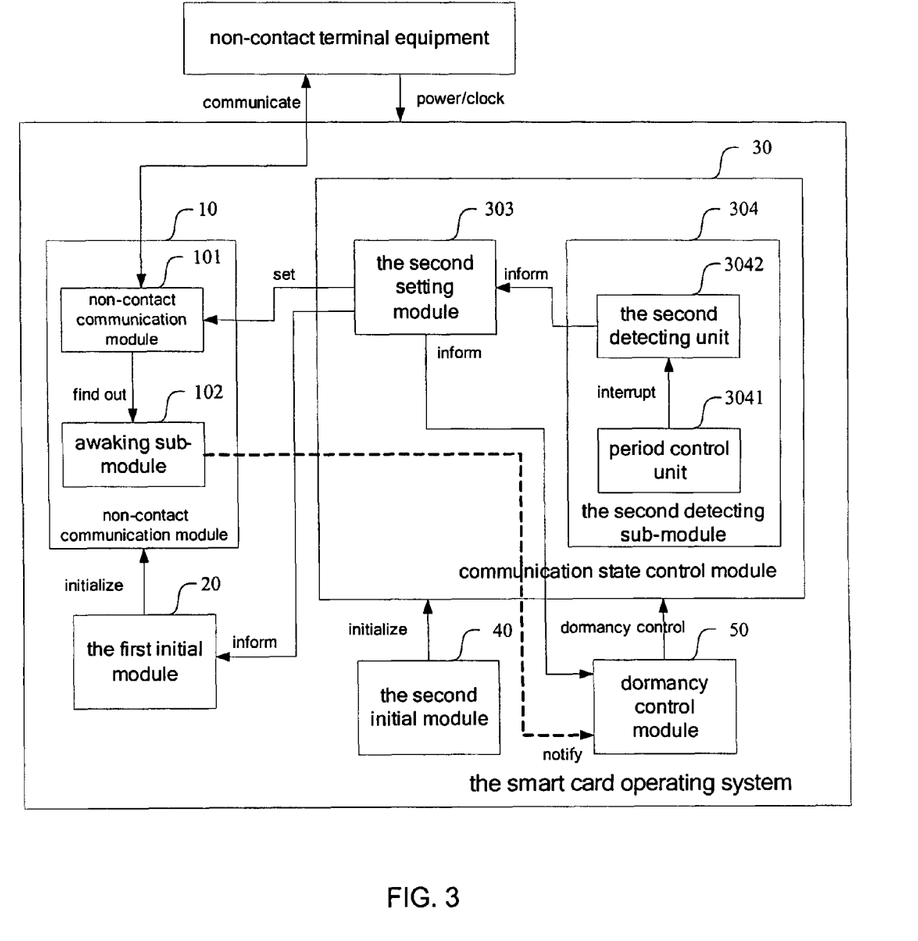
FIG. 3 is a block diagram of a smart card operating system in accordance with the second embodiment of the present invention.

As shown in FIG. 3, the smart card operating system in this embodiment includes the non-contact communication module 10, the first initial module 20, the communication state control module 30, the second initial module 40, and the dormancy control module 50. Compared with the first embodiment, the smart card operating system in this embodiment is added with a dominancy control module 50, and the non-contact communication module 10 includes the non-contact communication sub-module 101 and the awaking sub-module 102, the communication state control module 30 includes the second setting sub-module 303 and the second detecting sub-module 304, and the second detecting sub-module 304 includes the period control unit 3041 and the second detecting unit 3042.

When the system is powered on, the first initial module 20 and the second initial module 40 initialize the non-contact communication module 10 and the communication state control module 30 respectively. Especially in this embodiment, the second initial module 40.

Setting the initial value of the timer in the period control unit 3041.

Setting the state of the communication state control module 30 as dormancy.

When the system is powered on, if the smart card operating system enters the non-contact field, the non-contact communication sub-module 101 receives the inquiry from the non-contact terminal equipment, and the awaking sub-module 102 finds out that the smart card operating system enters the non-contact field based on the inquiry and informs the dormancy control module 50. The time point when the awaking sub-module 102 informs the dormancy control module 50 can be set as desired. In this embodiment, the awaking sub-module 102 informs the dormancy control module 50 right after the non-contact communication sub-module 101 finishes processing the first inquiry of the non-contact terminal equipment at the first stage of the non-contact communication module 10, and the dormancy control module 50 awakes the communication state control module 30.

When the communication state control module 30 is awaked, the timer in the period control unit 3041 is activated.

When the timer overflows (surpasses the set time), a sign of overflowing is set for the timer, and the period control unit 3041 creates an interrupt, based on which the second detecting unit 3042 detects whether there exists the non-contact power and/or clock: if yes, the smart card operating system is thought to be in the non-contact field and no more process will be done; otherwise, the smart card operating system is thought to be leaving the non-contact field and the second setting sub-module 303 is informed.

The second setting sub-module 303 sets the sign of non-contact communication state for the non-contact communication module 10 as IDLE at the first stage based on the information from the second detecting unit 3042.

The second setting sub-module 303 informs the dormancy control module 50 after setting the non-contact communication state sign of the non-contact communication module 10 as IDLE at the first stage, and the dormancy control module 50 controls the communication state control module 30 into the dormancy state.

When the smart card operating system reenters the non-contact field, the awaking sub-module 102 informs the dormancy control module 50 after the non-contact communication sub-module 101 finishes processing the first inquiry from the non-contact terminal equipment at the first stage of the non-contact communication module 10, and the dormancy control module 50 awakes the communication state control module 30. After the communication state control module 30 is awoken, the timer in the period control unit 3041 is activated to resume periodically checking whether the smart card operating system leaves the non-contact field.

It can be seen in this embodiment that, the communication state control module 30 is in dormancy state after it is powered on, it will not be awoken and starts to periodically inquire whether the smart card operating system leaves the non-contact field until the smart card operating system enters the non-contact field, once the smart card operating system is detected to be leaving the non-contact field and the corresponding process is done, the communication state control module 30 return to dormancy again till the smart card operating system re-enters the non-contact field. Such process can not only save energy but also avoid to continuously repeatedly setting the sign of the non-contact communication state as IDLE at the first stage. The sign of the non-contact communication state was already set as IDLE of the first stage before the communication state control module 30 enters the dormancy state so that the smart card operating system can properly communicates with the non-contact terminal equipments when it re-enters into the non-contact field.

In the present embodiment, the second setting sub-module 303 also informs the first initial module 20 after it receives the information from the second detecting sub-module 304, and the first initial module 20 initializes the non-contact communication module 10 and recovers the initial value of each register.

The periodic detecting method applied in the present embodiment can not find out whether the smart card leaves the non-contact field or not in real time. But in practical operation, the time needed for the smart card leaving and re-entering the field is much longer than the set time interval by the timer, so it can basically be detected that the smart card leaves the non-contact field by timing inquiry. In concrete implementation, some smart card operating systems can not provide field-entering interrupt and field-leaving interrupt, yet the technical scheme offered in this embodiment is universal for all smart card operating systems.

To sum up, the technical scheme of the present invention is suit for all smart card operating systems which support the non-contact communication, especially for those which have a fixed power supply instead of using the non-contact field to supply power for the system, such as the urgently needed smart card operating system which supports the mixed working mode, and overcomes the failure of non-contact communication resulting from that the smart card operating system is not needed to be re-powered on when it re-enters the non-contact field.

It will be evident that various modifications and changes may be made thereto without departing from the spirit and scope of the present invention Thus, the present invention described herein is intended to embrace all such modifications and changes as may fall within the appended claims, and their equivalents.

We claim:

1. A smart card operating system including a non-contact communication module, which is characterized in that, said smart card operating system also includes: a communication state control module which connects with said non-contact communication module to detect whether said smart card operating system enters and/or leaves the non-contact field or not, and set the communication state of said non-contact communication module based on the detection result;

said non-contact communication module includes a second storage unit to store the sign of the non-contact communication state to identify the communication state of said non-contact communication module.

2. A system as claimed in claim 1, which is characterized in that: said communication state control module includes:
   a first detecting sub-module, which detects whether said smart card operating system enters and/or leaves the non-contact field or not, and creates interrupt when said smart card operating system enters and/or leaves the non-contact field;
   a first setting sub-module, which sets the communication state of said non-contact communication module as IDLE based on said interrupt.

3. A system as claimed in claim 2, which is characterized in that: said first detecting sub-module includes: a first storage unit and a first detecting unit,
   said first detecting unit detects the non-contact power and/or clock, determines, according to the non-contact power and/or clock sign stored in said first storage unit, whether the non-contact power and/or clock is switching from inexistence to existence or from existence to inexistence, to find out whether the smart card operating system is passing in or out of the non-contact field, and sets respectively said non-contact power and/or clock sign when said smart card operating system enters and leaves the non-contact field, and creates interrupt when said smart card operating system enters and/or leaves the non-contact field.

4. A system as claimed in claim 1, which is characterized in that: said communication state control module includes:
   a second detecting sub-module to periodically detect whether said smart card operating system leaves the non-contact field or not, and to output the detection result;
   a second setting sub-module to set the communication state of said non-contact communication module as IDLE based on said detection result.

5. A system as claimed in claim 4, which is characterized in that: said second detecting sub-module includes:
   period control unit to output the triggering signal according to the set cycle;
   a second detecting unit to periodically detect the non-contact power and/or clock according to said triggering signal, and output the detection result when said smart card operating system leaves the non-contact field.

6. A system as claimed in claim 5, which is characterized in that: said system also includes a dormancy control module which connects with said communication state control module; and said non-contact communication module also includes awaking sub-module which connects with said dormancy control module;
   after said communication state control module sets the communication state of said non-contact communication module, said dormancy control module will control said communication state into the dormancy state;
   said awaking sub-module finds out that said system enters in the non-contact field based on the inquiry from the non-contact terminal equipment to said system, and informs said dormancy control module awaking said communication state control module.

7. A system as claimed in claim 4, which is characterized in that: said system also includes a dormancy control module which connects with said communication state control module; and said non-contact communication module also includes awaking sub-module which connects with said dormancy control module;

after said communication state control module sets the communication state of said non-contact communication module, said dormancy control module will control said communication state into the dormancy state;
said awaking sub-module finds out that said system enters in the non-contact field based on the inquiry from the non-contact terminal equipment to said system, and informs said dormancy control module awaking said communication state control module.

8. A system as claimed in claim 7, which is characterized in that: said system also includes a second initial module to initialize said communication state control module when the system is powered on, and set the state of said communication state control module as dormancy.

9. A system as claimed in claim 1, which is characterized in that: said system also includes a first initial module which respectively connects with said non-contact communication module and said communication state control module, and
   when setting the communication state of said non-contact communication module, said communication state control module also informs said first initial module to initialize said non-contact communication module.

10. A smart card operating method, which is characterized in that: the method includes the following steps:
    detecting whether said smart card operating system enters and/or leaves the non-contact field or not;
    setting the non-contact communication state of said smart card operating system based on the detection result; and
    storing the sign of the non-contact communication state to identify the communication state of said non-contact communication module.

11. A method as claimed in claim 10, which is characterized in that: said setting the non-contact communication state of said smart card operating system based on the detection result includes:
    setting the non-contact communication state of said smart card operating system as IDLE based on the detection result that said smart card operating system enters the non-contact field; and/or
    setting the non-contact communication state of said smart card operating system as IDLE based on the detection result that said smart card operating system leaves the non-contact field.

12. A method as claimed in claim 11, which is characterized in that:
    determining whether said system enters the non-contact field or not according to whether the non-contact power and/or clock switches from inexistence to existence or not; and/or
    determining whether said system leaves the non-contact field or not according to whether the non-contact power and/or clock change from existence to inexistence.

13. A method as claimed in claim 11, which is characterized in that: detecting the non-contact power and/or clock according to a predetermined cycle, and determining whether said system left the non-contact field or not based on whether there exists the non-contact power and/or clock.

14. A method as claimed in claim 10, which is characterized in that:
    determining whether said system enters the non-contact field or not according to whether the non-contact power and/or clock switches from inexistence to existence or not; and/or
    determining whether said system leaves the non-contact field or not according to whether the non-contact power and/or clock change from existence to inexistence.

15. A method as claimed in claim 10, which is characterized in that: detecting the non-contact power and/or clock according to a predetermined cycle, and determining whether said system left the non-contact field or not based on whether there exists the non-contact power and/or clock.

16. A method as claimed in claim 15, which is characterized in that: the smart card operating system stops detecting the non-contact power and/or clock after its communication state is set, and restarts periodically detect the non-contact power or clock after it finds out that said system enters in the non-contact field based on the inquiry from the non-contact terminal equipment to said system.

* * * * *